Patented July 17, 1934

1,966,475

UNITED STATES PATENT OFFICE 1,966,475

UTILIZING PURIFIED MUSA FIBER CELLULOSE

Edward Chauncey Worden, 1st, Millburn Township, Essex County, N. J., assignor to Hanson & Orth, New York, N. Y., a firm composed of Charles D. Orth, Sr., Charles D. Orth, Jr., Michael J. Smith, and William Knight, Jr.

No Drawing. Application December 2, 1930, Serial No. 499,534

22 Claims. (Cl. 260—101)

This invention relates to a process for the production of acetic esters of cellulose, by the utilization of highly purified cellulose obtained from Musa fiber.

It has been shown that a highly purified cellulose may be obtained from Musa fiber, high in alpha-cellulose content and relatively low in hemi-celluloses and other cellulosic bodies of inferior strength, and it has furthermore been shown that such alpha-cellulose, is extraordinarily strong especially in the esterified condition and is readily susceptible to esterification with the production of organic esters in which the unusually high tensile strength and other desirable physical characteristics of the alpha-cellulose, are present in the ester in a substantially unimpaired degree, and sometimes considerably augmented.

Operating with highly purified alpha-cellulose properly prepared from the Musa group of fibers, a wide variety of acetated celluloses may be obtained, especially applicable for plastic, lacquer, imitation leather or artificial filament use, either alone or in conjunction with inorganic cellulose esters as disclosed in my Ser. No. 499,129, filed November 29, 1930.

One of the objects of this invention is the preparation of acetylated derivatives from cellulose, and especially from highly purified Musa fiber cellulose, by the treatment of said fibers with phosphorus pentoxide prior to acetylation to form an ester having unusually high tensile strength and other desirable characteristics in the filament or film form and a ready solubility in a wide variety of solutions.

It is generally conceded, other factors being equal that those celluloses of high natural strength and other desirable properties, result in the formation of esters where the esterization process has been properly conducted, in which the strength of the original cellulosic fiber is likewise imparted to the fiber in the esterified condition. I have found this to be especially true with fibers of the Musa group, long recognized as possessing abnormally high tensile strength, both in the dry and wetted condition, and with the purified cellulose obtained therefrom as has been disclosed, while somewhat reduced in strength as compared with the strength of the original Musa fiber, yet retains to a high degree those valuable properties of tenacity and strength which has made Musa fibers so widely used in the arts.

I have found, and this invention discloses, that when operating upon highly purified cellulose obtained from purified Musa fiber cellulose as has been described, organic esters of cellulose may be formed, when proceeding according to the description set forth in this invention, which possess to an unusual degree those desirable properties of high tensile strength in the filament and film form, both in the dry and wetted condition, and also a ready solubility in a wide variety of easily obtained and inexpensive solvents, solvent combinations and mixtures of cellulose ester solvents and non-solvents, diluents, softeners, flexilizers and plastifiers.

In the esterization of purified Musa fiber cellulose and the alpha-cellulose obtained therefrom, especially in the production of organic esters, such as acetylized compounds of cellulose, I have found, that acetylated cellulose products are obtainable of a wide variety of desirable properties, both in the substantially non-hydrolyzed and partially hydrated condition subsequent to precipitation, which renders them especially valuable in the cellulose ester art.

I will now give one example as indicative of carrying my invention into effect, it being understood that this is merely an illustrative example and may be modified within comparatively wide limits depending upon the properties desired in the finished ester and the uses to which it is intended to be put, without affecting the basicity of my invention, which is the preparation of acetylated celluloses from highly purified cellulose, especially that obtained from Musa fiber cellulose, or cellulose high in alpha-cellulose and relatively low in hemi-cellulosic bodies as obtained from Musa fiber, when said purified cellulose is pre-treated with phosphorus pentoxide before esterification, and the process may be broadly exemplified by proceeding in the manner following:—

I prefer to employ Musa fiber cellulose high in alpha-cellulose, and which has preferably been previously mechanically subdivided in any convenient manner into particles weighing a fraction of a gram each, that is possessing a relatively high superficial area for its weight. The casting of the cellulose in thin sheets and then disintegrating said sheets by a tearing or teasing operation into pieces of area of about one square inch or less, has proven satisfactory in this connection. The cellulose particles are dried at a temperature preferably under 100° C. until the cellulose has reached the condition of aridity comprehended by the term "bone dry", and then allowed to cool to room temperature, and in warm weather to temperatures somewhat below, in tightly sealed containers. One unit weight of cellulose is placed in a mixing apparatus with stirring members, the interior of the mixer being constructed of material unaffected or not injuriously affected by the chemicals used in the operation, the mixer being provided with a circulatory cooling system of brine or other refrigerant, whereby the temperature of the material within the mixture may be controlled. From 2% to 10% of phosphorus pentoxide (phosphoric anhydride) based on the weight of cellulose used is then blown on in the form of an impalpable powder by means of dry air on and in the cellulosic mass while the latter is in agitation, and after the addition of phosphorus pentoxide powder, the mass is continually agitated for ¼ to 1 hour, preferably keeping the temperature at 20° C. or lower. The action of pentoxide has a tendency to cause the cellulose particles to become gummy in appearance and to partially adhere, and this effect and appearance may be considerably modified by the amount of moisture present in the cellulose being operated upon. This dehydrating and/or other action of the pentoxide facilitates the subsequent acetylization of the cellulose, and apparently causes the introduction of acetic acid radical into the cellulosic aggregate to take effect more quickly and uniformly and with less acetic anhydride and acetic acid than if this treatment prior to esterification is omitted. The use of sulfuric acid and other powerfully acting catalytic bodies in the esterification mixture becomes unnecessary.
Three and one-half parts acetic anhydride, commercial concentrated, equivalent to at least 2.90 parts absolute anhydride are then slowly added, preferably by means of a spray, agitation being continued, after which is added, 3.9 parts glacial acetic acid, and agitation continued, the temperature being preferably kept at about 20° C. or lower, until the cellulose has substantially passed into solution, resulting in the formation of a heavy, syrupy appearing liquid, with but few visible undissolved or partially dissolved particles. The action of the esterifying components upon the cellulose may be facilitated by allowing the reaction to proceed at a higher temperature, and I have obtained satisfactory results with temperatures as high as 50° C., but I prefer a lower temperature. When the cellulose has become disintegrated and an apparently homogeneous solution results, the temperature may then be allowed to rise to between 35° and 50° C. to clarify the solution and apparently complete or stabilize the esterification, this rise in temperature usually diminishing the viscosity of the mass and causing it to become more nearly transparent. A test portion is then removed, rapidly precipitated in a large bulk of cold water, washed to neutrality and dried, and it will be found soluble or substantially so in chloroform free from ethyl alcohol, either at the ordinary temperature or aided by heat, and to be nearly insoluble in anhydrous acetone, when the esterification has been carried to the preferable point.

The esterified mass is now treated with 5% to 10% of 50% to 60% aqueous acetic acid, preferably by atomizing, and with vigorous agitation, and the mass left at a temperature around 40° C. until the desired solubility constants are obtained, depending upon the uses to which the finished product is to be put. After partial hydration to the degree, point or extent desired, the gelatinous mass is placed in a container with agitator, cold water carefully added in small portions with continual agitation until the point of precipitation has been nearly reached, then a large bulk of cold water quickly added to complete the precipitation. The flocculent mass is then centrifugalized, washed with water until neutral, stabilized by heating with dilute alkali metal carbonate again washed, and dried at a temperature preferably under that of boiling water, when it is ready for use.

Thus prepared, the final product is a white, fluffy, neutral structureless mass, devoid of taste and odor, free from horny particles, soluble in acetone, concentrated acetic acid and other solvents and solvent combinations, and of unusual strength when deposited from solutions in the filament or film form, whether the solvents are entirely volatile or contain softeners, plastic-inducing bodies or flexilizing components.

Having now described my invention and the manner in which the same may be performed, what I claim and desire to secure by Letters Patent is:—

1. A process for the preparation of acetated cellulose from cellulose, comprising drying the cellulose until the "bone dry" condition has been reached then adding phosphorus pentoxide in amount equivalent to about 2%–10% of the weight of cellulose used then adding acetic anhydride and glacial acetic acid the temperature being kept at 20° C. then precipitating the acetylated mass washing until neutral and drying substantially as herein set forth.

2. A process for the manufacture of acetylated cellulose from Musa fiber cellulose comprising drying the cellulose at a temperature under 100° C. placing the cellulose in a closed container, with agitator then atomizing phosphorus pentoxide keeping the temperature at about 20° C. then adding 3.5 parts commercial acetic anhydride and 3.9 parts glacial acetic acid the temperature being kept below 20° C. until a portion is soluble in chloroform pure then precipitating the acetylated mass with water washing until neutral and drying at temperature below 100° C. as described herein.

3. A process for the formation of acetic esters of cellulose from highly purified cellulose obtained from Musa fiber comprising drying the cellulose in a fine state of subdivision placing the cellulose in a closed container, with agitator and temperature control then atomizing while the cellulose is in agitation phosphorus pentoxide in amount equivalent to about 2%–10% of the weight of cellulose used keeping the temperature at about 20° C. or lower then adding 3.5 parts concentrated acetic anhydride and glacial acetic acid the temperature being kept at about 20° C. until the reaction has reached the point desired then precipitating the acetylated mass washing until neutral and drying substantially as herein set forth.

4. A process for the preparation of acetylated cellulose from purified Musa fiber high in alpha-cellulose comprising drying the cellulose in thin leaves cooling the cellulose to room temperature then adding phosphorus pentoxide keeping the temperature at about 20° C. then adding at least 2.90 parts absolute acetic anhydride and 3.9 parts glacial acetic acid the temperature being kept at 20° C. until esterification has been completed then precipitating the acetylated mass with water washing until neutral and drying at temperature below 100° C. as described herein.

5. A process for the manufacture of acetated cellulose from cellulose comprising drying the cellulose at a temperature under 100° C. cooling the cellulose out of contact with the air placing the cellulose in a closed container, with agitator then atomizing phosphorus pentoxide in amount equivalent to about 2%–10% of the weight of cellulose used keeping the temperature at about 20° C. or lower than adding acetic anhydride and glacial acetic acid the temperature being kept below 20° C. until acetation has been completed then precipitating the acetylated mass washing until neutral and drying substantially as herein set forth.

6. A process for the formation of acetylized cellulose from Musa fiber cellulose comprising drying the cellulose in a fine state of subdivision cooling the cellulose until a temperature of about 20° C. has been reached placing the cellulose in a closed container, with agitator and temperature control then atomizing while the cellulose is in agitation phosphorus pentoxide keeping the temperature at about 20° C. then adding 3.5 parts commercial acetic anhydride and 3.9 parts glacial acetic acid the temperature being kept at about 20° C. then precipitating the acetylated mass with water washing until neutral and drying at temperature below 100° C. as described herein.

7. A process for the preparation of acetyl cellulose from highly purified cellulose obtained from Musa fiber comprising drying the cellulose in thin leaves then adding phosphorus pentoxide in amount equivalent to about 2%–10% of the weight of cellulose used keeping the temperature at about 20° C. or lower then adding 3.5 parts concentrated acetic anhydride and glacial acetic acid the temperature being kept at 20° C. until a portion is soluble in chloroform pure then precipitating the acetylated mass washing until neutral and drying substantially as herein set forth.

8. A process for the manufacture of cellulose acetates from purified Musa fiber high in alpha-cellulose comprising drying the cellulose at a temperature under 100° C. placing the cellulose in a closed container, with agitator then atomizing phosphorus pentoxide keeping the temperature at about 20° C. then adding at least 2.90 parts absolute acetic anhydride and 3.9 parts glacial acetic acid the temperature being kept below 20° C. until the reaction has reached the point desired then precipitating the acetylated mass with water washing until neutral and drying at temperature below 100° C. as described herein.

9. A process for the formation of esterized cellulose from cellulose comprising drying the cellulose in a fine state of subdivision placing the cellulose in a closed container, with agitator and temperature control then atomizing while the cellulose is in agitation phosphorus pentoxide in amount equivalent to about 2%–10% of the weight of cellulose used, keeping the temperature at about 20° C. or lower, then adding acetic anhydride and glacial acetic acid the temperature being kept at about 20° C. until esterification has been completed then precipitating the acetylated mass washing until neutral and drying substantially as herein set forth.

10. A process for the preparation of esterified cellulose from Musa fiber cellulose comprising drying the cellulose in thin leaves cooling the cellulose to room temperature then adding phosphorus pentoxide keeping the temperature at about 20° C. then adding 3.5 parts commercial acetic anhydride and 3.9 parts glacial acetic acid the temperature being kept at 20° C. until acetation has been completed then precipitating the acetylated mass with water washing until neutral and drying at temperature below 100° C. as described herein.

11. A process for the manufacture of organic esters of cellulose from highly purified cellulose obtained from Musa fiber comprising drying the cellulose at a temperature under 100° C. cooling the cellulose out of contact with the air placing the cellulose in a closed container, with agitator then atomizing phosphorus pentoxide in amount equivalent to about 2%–10% of the weight of cellulose used keeping the temperature at about 20° C. or lower then adding 3.5 parts concentrated acetic anhydride and glacial acetic acid the temperature being kept below 20° C. then precipitating the acetylated mass washing until neutral and drying substantially as herein set forth.

12. A process for the formation of acetylated cellulose from purified Musa fiber high in alpha-cellulose comprising drying the cellulose in a fine state of sub-division cooling the cellulose until a temperature of about 20° C. has been reached placing the cellulose in a closed container, with agitator and temperature control, then atomizing while the cellulose is in agitation phosphorus pentoxide keeping the temperature at about 20° C. then adding at least 2.90 parts absolute acetic anhydride and 3.9 parts glacial acetic acid the temperature being kept at about 20° C. until a portion is soluble in chloroform pure then precipitating the acetylated mass with water washing until neutral and drying at temperature below 100° C. as described herein.

13. A process for the preparation of acetated cellulose from cellulose comprising drying the cellulose in thin leaves then adding phosphorus pentoxide in amount equivalent to about 2%–10% of the weight of cellulose used keeping the temperature at about 20° C. or lower then adding acetic anhydride and glacial acetic acid the temperature being kept at 20° C. until the reaction has reached the point desired then precipitating the acetylated mass washing until neutral and drying substantially as herein set forth.

14. A process for the manufacture of acetylized cellulose from Musa fiber cellulose comprising drying the cellulose placing the cellulose in a closed container, with agitator then atomizing phosphorus pentoxide keeping the temperature at about 20° C. then adding 3.5 parts commercial acetic anhydride and 3.9 parts glacial acetic acid the temperature being kept below 20° C. until esterification has been completed then precipitating the acetylated mass with water washing until neutral and drying at temperature below 100° C. as described herein.

15. A process for the formation of acetyl cellulose from highly purified cellulose obtained from Musa fiber comprising drying the cellulose placing the cellulose in a closed container, with agitator and temperature control then atomizing while the cellulose is in agitation phosphorus pentoxide in amount equivalent to about 2%–10% of the weight of cellulose used keeping the temperature at about 20° C. or lower then adding 3.5 parts concentrated acetic anhydride and glacial acetic acid the temperature being kept at about 20° C. until acetation has been completed then precipitating the acetylated mass washing until neutral and drying substantially at herein set forth.

16. In the acetylation of cellulose the step comprising treating cellulose that is in a substantially bone dry state with phosphorus pentoxide prior to subjecting the cellulose to acetylation treatment.

17. In the acetylation of cellulose the step comprising adding to substantially bone dry cellulose, phosphorus pentoxide in the proportion of 2% to 10% by weight on the cellulose, prior to contacting the cellulose with acetylating agents.

18. In the acetylation of cellulose the steps comprising subjecting substantially bone dry cellulose to treatment with phosphorus pentoxide, and thereafter to treatment with acetic anhydride and acetic acid in the substantial absence of an added catalyst.

19. In the acetylation of cellulose the steps comprising subjecting substantially bone dry cellulose to treatment with phosphorus pentoxide, and thereafter to treatment with acetic anhydride and acetic acid in the substantial absence of sulfuric acid added as a catalyst.

20. In the acetylation of cellulose the steps comprising subjecting substantially bone dry cellulose to treatment with phosphorus pentoxide, and thereafter to treatment with acetic anhydride and acetic acid in the substantial absence of a catalyst.

21. In the acetylation of Musa fiber, the steps comprising treating substantially bone dry cellulose of Musa fiber with phosphorus pentoxide, and thereafter treating said cellulose with acetic anhydride and acetic acid to effect acetylation thereof.

22. In the acetylation of cellulose the step comprising treating cellulose that is in a "bone-dry" state with phosphorus pentoxide and converting the cellulose to a partially adherent state prior to subjecting the cellulose to acetylating treatment.

EDWARD CHAUNCEY WORDEN, I.